United States Patent [19]

van der Lely

[11] 4,057,110

[45] Nov. 8, 1977

[54] ROTARY HARROWS

[76] Inventor: Cornelis van der Lely, 7, Bruschenrain, Zug, Switzerland

[21] Appl. No.: 623,422

[22] Filed: Oct. 17, 1975

Related U.S. Application Data

[63] Continuation of Ser. No. 504,076, Sept. 9, 1974, abandoned, which is a continuation of Ser. No. 312,881, Dec. 7, 1972, abandoned.

[30] Foreign Application Priority Data

Jan. 7, 1972 Netherlands .......................... 7271682

[51] Int. Cl.² ...................... A01B 33/06; A01B 33/10; A01B 49/06
[52] U.S. Cl. ........................................ 172/49; 172/59; 172/63; 172/68; 172/70; 172/103; 172/713; 111/85
[58] Field of Search ....................... 172/49, 59, 57, 48, 172/111, 103, 110, 112, 681, 685, 691, 713, 522–526, 271, 765, 768

[56] References Cited

U.S. PATENT DOCUMENTS

| 280,751 | 7/1883 | Lux et al. ........................... 172/768 X |
| 2,205,188 | 6/1940 | Coddigan et al. ................. 172/523 X |
| 2,410,273 | 10/1946 | Deubner ........................... 172/111 X |
| 2,670,668 | 3/1954 | König ................................ 172/271 X |
| 2,750,859 | 6/1956 | Smithburn ....................... 172/103 X |
| 2,751,832 | 6/1956 | Briscoe ............................. 172/111 X |
| 3,347,188 | 10/1967 | Richey .............................. 172/112 X |
| 3,616,862 | 11/1971 | van der Lely ..................... 172/59 X |
| 3,667,551 | 6/1972 | van der Lely et al. .......... 172/111 X |

FOREIGN PATENT DOCUMENTS

| 395,253 | 12/1908 | France ................................. 172/523 |
| 419,112 | 10/1910 | France ................................. 172/523 |
| 458,501 | 4/1928 | Germany ............................. 172/59 |
| 6,706,636 | 11/1968 | Netherlands ........................ 172/59 |
| 6,908,785 | 12/1970 | Netherlands ........................ 172/59 |
| 1,977 of | 5/1881 | United Kingdom ................ 172/111 |

Primary Examiner—Paul E. Shapiro
Attorney, Agent, or Firm—Mason, Mason & Albright

[57] ABSTRACT

A harrow attachment has side-by-side rotary soil-working members mounted on upright axes journalled in a frame. A delivery mechanism with an elongated hopper and agitators and/or other feeding mechanisms can be connected to be rotatable and driven by the power take off of the prime mover or transmission connections from a rotary roller pivotably secured on arms to the frame to trail the working members. The working members are rotors with tines or earth working portions formed by a single metal sheet material which has been bent over to form two downwardly extending blades with lower parts that are inclined rearwardly. The blades are twisted so that leading cutting edges work overlapping paths and a horizontal portion of the rotors is secured by breakable bolts to upright shafts.

7 Claims, 11 Drawing Figures

ROTARY HARROWS

This application is a continuation of Ser. No. 504,076 filed Sept. 9, 1974, which is a continuation of Ser. No. 312,881 filed Dec. 7, 1972, both now abandoned.

According to one aspect of the invention, there is provided a rotary harrow or cultivator of the kind set forth, wherein delivery members for material in said container are connected to that container and are supported at one side of said frame portion.

For a better understanding of the invention, and to show how the same may be carried into effect, reference will now be made, by way of example, to the accompanying drawings, in which:

FIG. 6 is a plan view illustrating an alternative form of rotary harrow in accordance with the invention coupled to the rear of an agricultural tractor, FIG. 8 is a sectional side elevation, to an enlarged scale, of the bottom of the hopper of a mechanism for introducing seeds, artificial fertilisers and the like into worked soil, said mechanism being included in the rotary harrow of FIGS. 6 and 7, FIG. 9 is a rear elevation as seen in the direction indicated by an arrow IX in FIG. 8, FIG. 10 substantially corresponds to FIG. 7 but illustrates a further alternative form of rotary harrow in accordance with the invention, and FIG. 11 substantially corresponds to FIGS. 7 and 10 and shows a still further alternative construction.

Figure 1:
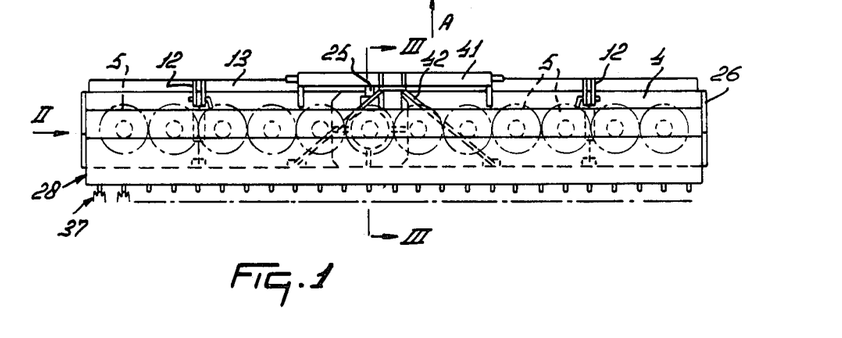
FIG. 1 is a plan view of a rotary harrow in accordance with the invention.
Figure 2:
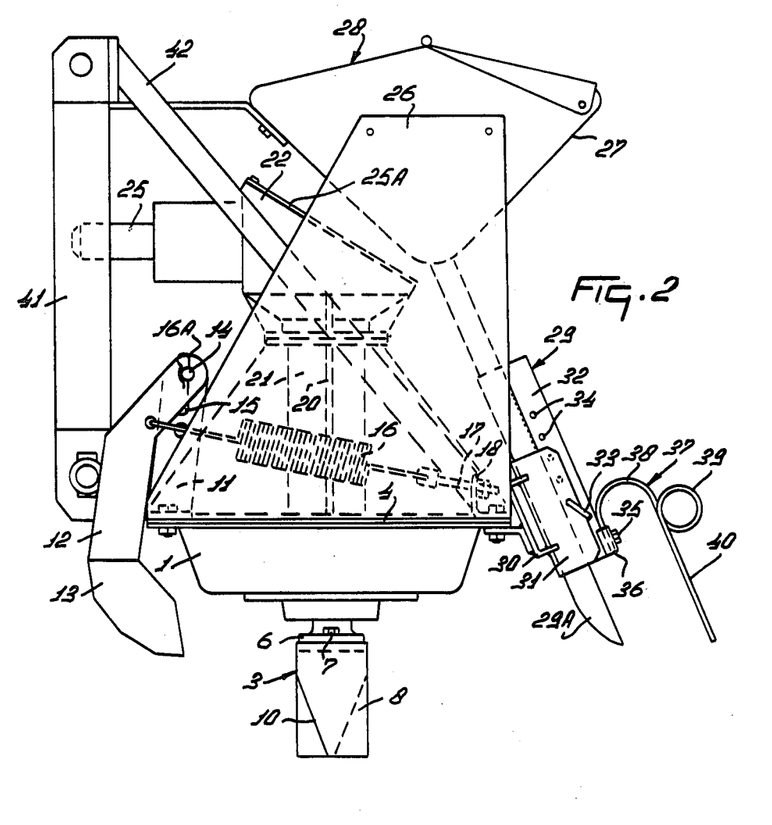
FIG. 2 is a side elevation, to an enlarged scale, as seen in the direction indicated by an arrow II in FIG. 1.

Referring to FIGS. 1 to 5 of the drawings, the rotary harrow or soil cultivator which is illustrated has a frame portion 1 of hollow box-like configuration that extends substantially horizontally perpendicular to the intended direction of operative travel of the harrow which is indicated by an arrow A in FIG. 1. The frame portion 1 accommodates a plurality (in this case, twelve) of vertical or substantially vertical rotary shafts 2 that are regularly spaced apart from one another in a single row by center-to-center distances of substantially 25 centimeters. The lowermost end of each shaft 2 carries a corresponding soil-working member or rotor that is generally indicated by the reference 3. Each shaft 2 is rotatably supported at the bottom of the frame portion 1 by a bearing and also by a further bearing at the top of said portion 1, the uppermost bearings being secured to a substantially horizontal top plate 4 of the frame portion 1 which top plate 4 is itself secured to the rims of an underlying dished plate of said frame portion by small bolts. Each shaft 2 is provided inside the hollow frame portion 1 with a corresponding spur-toothed pinion 5 and it will be seen in broken lines in FIG. 1 of the drawings that the teeth of each pinion 5 are in driven or driving and driven mesh with those of its neighbour or each of its two neighbours. The lowermost end of each rotary shaft 2 projects from the bottom of the frame portion 1 and is there provided with a substantially horizontally extending strong wrought iron flange 6 and each flange 6 has a horizontal portion 9 of a corresponding one of the soil working members or rotors 3 secured to it by two substantially vertical bolts 7 that are formed from a strong but relatively easily fractured material. The horizontal portion 9 of each soil working member or rotor 3 has its opposite ends connected to two upright blades 8 which blades, in this embodiment, are integral with the opposite ends of the portion 9, said blades 8 and portion 9 conveniently being made from single pieces of sheet metal. Each blade 8 preferably has a length of substantially twelve centimeters between its upper and lower extremities.

Figure 4:
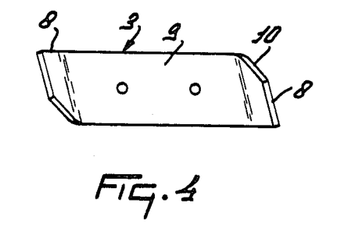
FIG. 4 is an underneath view of one part of the harrow as seen in the direction indicated by an arrow IV in FIG. 3.
Figure 5:
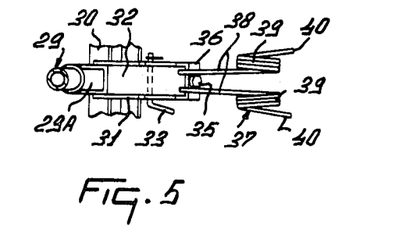
FIG. 5 is a section taken on the line V—V of FIG. 3.

It can be seen from FIG. 4 of the drawings that the blades 8 of each soil working member or rotor 3 are turned or twisted to some extent about their own longitudinal axes and that their leading edges with respect to the intended directions of rotation of the corresponding shafts 2 are formed as rearwardly and downwardly inclined cutting edges 10 that extend throughout substantially two-thirds of the upright length of each blade 8. It will also be noted that, due to the aforementioned turning or twisting of the blades 8, the cutting edges 10 thereof are closer to the axes of rotation afforded by the corresponding shafts 2 than are the rearmost plain edges of the blades 8.

Upright brackets 11 are provided on top of the frame portion 1 and at the front thereof with respect to the direction A, said brackets 11 having arms 12 pivotally connected to them with the aid of substantially horizontal pins 14. The arms 12 extend downwardly and forwardly in pairs and their lowermost ends are interconnected by a substantially horizontal beam 13 of lightweight construction that extends throughout substantially the whole of the working width of the harrow. It will be seen from FIGS. 2 and 3 of the drawings that the lower surface and front of the beam 13 with respect to the direction A is effectively rounded off and that, in cross-section, said beam is generally inclined downwardly and rearwardly with respect to the direction A from its top. The pins 14 that afford pivotal connections between the brackets 11 and the arms 12 are entered through single aligned holes in the upper ends of the arms 12 but through any selected one of a number of vertically spaced holes 15 in each respective bracket 11. Resilient "safety" pins 16A are passed through transverse bores near the ends of the pins 14 to retain those pins in their selected positions and it will be realised that the particular holes 15 which are selected for co-operation with the pins 14 determine the height of the beam 13 relative to the frame portion 1 thus governing to a large extent the depth of penetration of the blades 8 into the soil during operation of the harrow. A helical tension spring 16 is stretched between horizontally aligned holes in each pair of arms 12 and a corresponding adjusting screw 17, said holes in the arms 12 being formed at a level below that of the pivot pins 14. The longitudinal axes of the two springs 16 both extend substantially horizontally and the two adjusting screws 17 are entered through holes in supporting brackets 18 mounted at the top and rear of the frame portion 1, the shanks of the screws 17 being provided with pairs of nuts which can be displaced axially of the screws to increase or decrease the initial degree of tension of the springs 16 as may be required.

The shaft 2 of one of the central pair of soil working members or rotors 3 is provided with an upward extension 19 that is entered axially through a tube 21 that is fastened on top of the frame portion 1 by supports 20. The extension 19 has its upper end rotatably journalled in a gear box 22 and is provided inside that gear box with a bevel pinion 23. The bevel pinion 23 is in driven mesh with a smaller bevel pinion 24 located at the inner end of a forwardly projecting substantially horizontal rotary input shaft 25. It will be noted that the top of the gear box 22 is afforded by a removable plate 25A that is inclined downwardly and rearwardly from its leading edge to its rear edge with respect to the direction A.

Substantially vertical supports 26 located at the opposite lateral sides or ends of the frame portion 1 carry a funnel-shaped container or hopper 27 of a mechanism 28 for supplying materials such as seeds, fertilisers, pesticides and the like onto and/or into the soil, said hopper 27 being elongated in a substantially horizontal direction that is perpendicular to the direction A. The hopper 27 accommodates a feed mechanism 27A (FIG. 3) that is located above the upper ends of tubular delivery members 29 that extend from the base of the hopper 27 downwardly and rearwardly with respect to the direction A towards the rear of the harrow. The lowermost end of each tubular delivery member 29 is provided with an upwardly and downwardly displaceable portion 29A (FIGS. 3 and 5), the portions 29A being upwardly and downwardly displaceable relative to a support 30 carried at the rear of the frame portion 1. The support 30 carries a plurality of brackets 31 that are equal in number to the number of displaceable portions 29A and each bracket 31 houses, between its limbs, a corresponding slider 32 formed with a row of holes 34. The limbs of the brackets 31 are formed with single horizontally aligned holes and a horizontal locking pin 33 is provided for insertion through those holes and a chosen intervening hole 34 of the slider 32, the chosen hole 34 thus determing the setting of the corresponding displaceable portion 29A relative to the tubular delivery member 29 under consideration. The rear of each slider 32 with respect to the direction A is provided with a corresponding pair of tines 37 that are formed from a single length of spring steel or other resilient wire or rod. The junction between the two tines 37 of each pair takes the form of a substantially 180° bend which is fastened to the corresponding slider 32 by a clamp 36 and a bolt 35 entered between the limbs of said bend. Each pair of tines 37 extends upwardly from the corresponding clamped bend through substantially 180° curves 38 that are orientated rearwardly with respect to the direction A, the free ends of said bends 38 merging into 360° loops 39 which loops, in turn, terminate in straight working portions 40 that are downwardly and rearwardly inclined with respect to the direction A at substantially the same angles as the delivery members 29 to which they are indirectly connected.

The front of the frame portion 1 with respect to the direction A carries a generally triangular coupling member or trestle 41 that is adapted for connection, in a manner that is known per se, to the three-point lifting device or hitch of an agricultural tractor or other operating vehicle. Rearwardly and downwardly divergent tie bars 42 extend between the top of the coupling member 41 and locations at the top and rear of the frame portion 1. A strengthening strip 43 also extends between the top of the coupling member 41 and a central location at the front of the hopper 27, said strip 43 thus extending substantially parallel to the direction A.

Figure 3:
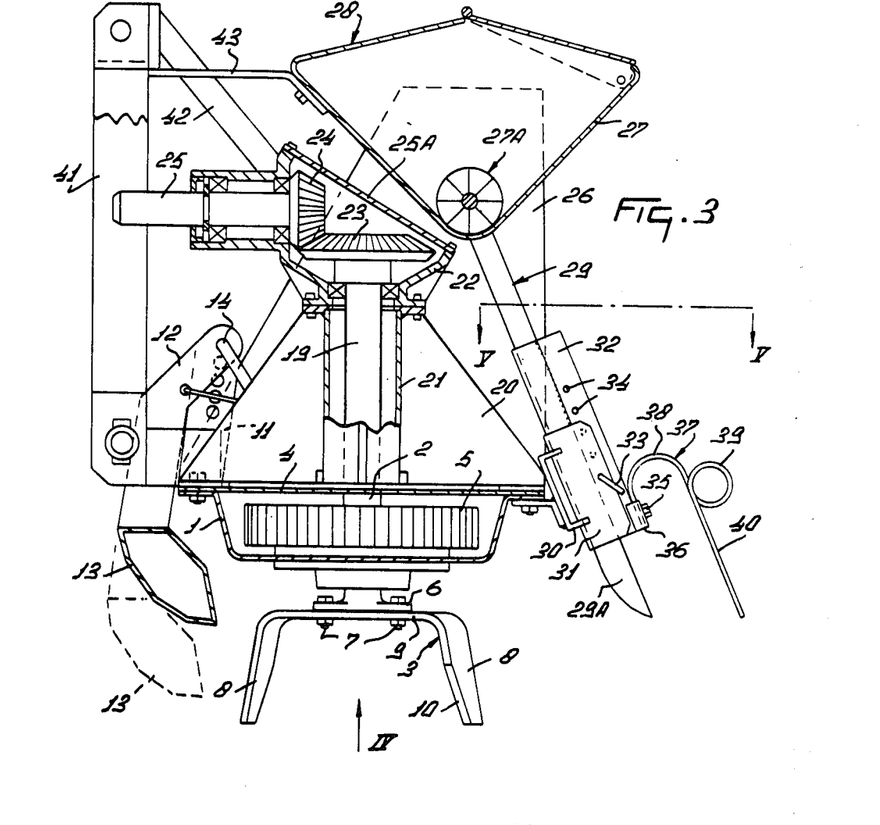
FIG. 3 is a section, to an enlarged scale, taken on the line III—III of FIG. 1.

In the use of the rotary harrow that has been described with reference to FIGS. 1 to 5 of the drawings, its coupling member or trestle 41 is connected in known manner to the three-point lifting device of an agricultural tractor or other operating vehicle and the leading end of the splined or otherwise keyed rotary input shaft 25 is placed in driven connection with the power take-off shaft of the same tractor or other operating vehicle with the aid of an intermediate telescopic transmission shaft (not shown) of known construction having universal joints at its opposite ends. After the beam 13 in front of the frame portion 1 has been adjusted to a desired height by entering the pins 14 through appropriate holes 15, the harrow can be moved upwardly out of operation and downwardly into operation by appropriate control of the lifting device or hitch of the tractor or other operating vehicle. As the harrow is moved operatively over a field in the direction A, the soil working members or rotors 3 are rotated from the gear box 22 in such a way that the two rotors 3 of each neighbouring pair revolve in opposite directions, all of the rotors 3 working individual strips of soil which overlap one another to produce, in effect, a single broad strip of worked soil because the distances between the blades 8 of each rotor 3 are greater than the perpendicular distances between the axes of rotation of neighbouring rotors 3 about their axes of rotation are angularly staggered to prevent the blades 8 from fouling one another during operation. The downwardly and rearwardly bevelled cutting edges 10 of the blades 8 are located foremost with respect to the direction of rotation of each rotor 3 and it has been found that the angularly twisted or turned positions of the blades 8 about their longitudinal axes minimises the risk of the blades cutting out large lumps or clods when heavy soil is being worked so that the number of such lumps or clods which are produced is very small indeed. Owing to the structure of the soil working members or rotors 3 which has been described above and which is illustrated in FIGS. 3 and 4 of the drawings, the cutting edges 10 of the blades 8 are nearer to the axes of rotation of the rotors than are the trailing edges of said blades and this ensures that the soil is frequently cut along its natural lines of rupture or breakage. The described and illustrated disposition of the leading cutting edges 10 of the blades 8 ensures that weeds, stubble and the like are readily chopped and loosened from the ground. As the rotary harrow moves forwardly over the soil that is to be worked, the beam 13 rides over the surface of that soil partially supporting the harrow and levelling the surface of the soil to some extent due to the effectively rounded-off leading and lower surface of the beam. If a stone or other obstacle should get between one or more of the rotors 3 and the beam 13, said beam can deflect forwardly against the action of the springs 16 thus releasing the stone or other obstacle. As previously mentioned, the depth of penetration of the blades 8 into the soil is varied by raising or lowering the horizontal level of the beam 13 relative to the rest of the harrow by engaging the pins 14 in appropriate holes 15. FIG. 3 of the drawings shows two different possible horizontal settings of the beam 13 in full and broken lines respectively. If desired, the strip of land that has been worked by the blades 8 of the rotors 3 can immediately be sown with seeds by the mechanism 28. Said mechanism 28 will then function as a seed drill and all that is necessary is to move the sliders 32 downwardly to an extent that is suitable to match the operating level set by the position of the beam 13 and subsequently to replace the pins 33 in appropriate holes 34. The adjustment of the displaceable portions 29A which results simultaneously adjusts the positions of the tines 37 which tines serve to agitate the soil that has been formed into furrows by the preceding portions 29A, which serve as coulters under these circumstances, thus leaving a substantially smooth sown seed bed in which a very large majority of the seeds will be at the correct depth and covered with a layer of fine soil. The feed mechanism 27A may be driven from one end of the hopper 27 by an assembly that is not shown in the drawings but which comprises a ground-engaging wheel, roller or the like that is rotated by travel of the harrow over the ground in the direction A, such rotation being mechanically transmitted to the feed mechanism 27A. Alternatively, the mechanism 27A may be rotated by drive derived from the operating tractor or other vehicle through the intermediary of the rotary input shaft 25.

In the rotary harrow which has been described, the blades 8 of each of the soil working members or rotors 3 are preferably made from single pieces of sheet material which includes the intermediate horizontal portion 9. The horizontal portions 9 are fastened to the flanges 6 by the breakable bolts 7 and this construction has the advantage of avoiding damage to the soil working members or rotors 3 if they should meet a substantially immovable obstacle during the operation of the harrow since, upon a predetermined resistance to rotation being exceeded, the bolts 7 will shear thus freeing the corresponding flange 6 and shaft 2. It is only necessary to replace the broken bolts 7 to restore the harrow to its fully operative condition. The rotary harrow that has been described above in which the blades 8 have effective lengths of substantially 12 centimeters each is particularly suitable for the rapid preparation of soil for the sowing of cereal crops, the relatively simple construction of the harrow allowing it to be manufactured at a competitive price even though it includes a seed drill which enable the cereal crops to be sown simultaneously with the preparation of the seed bed.

Figures 6, 8, 9:
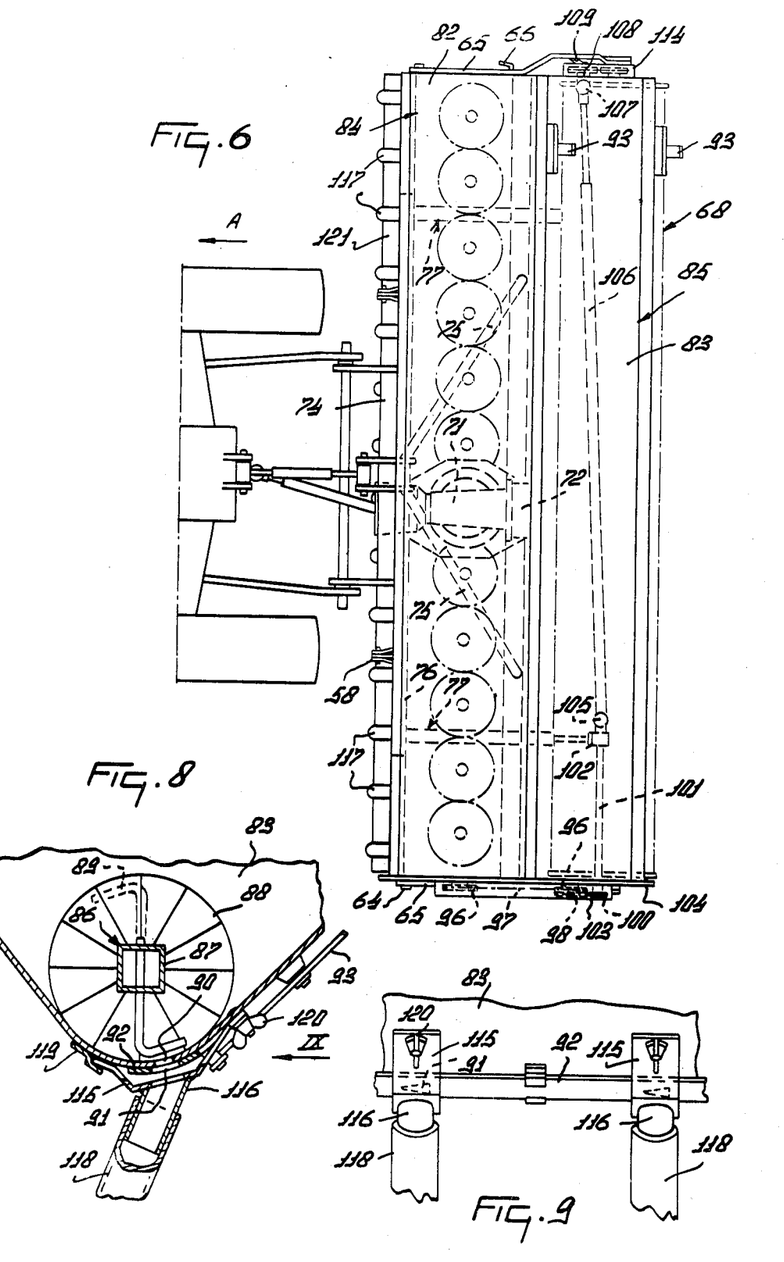
Figure 7:
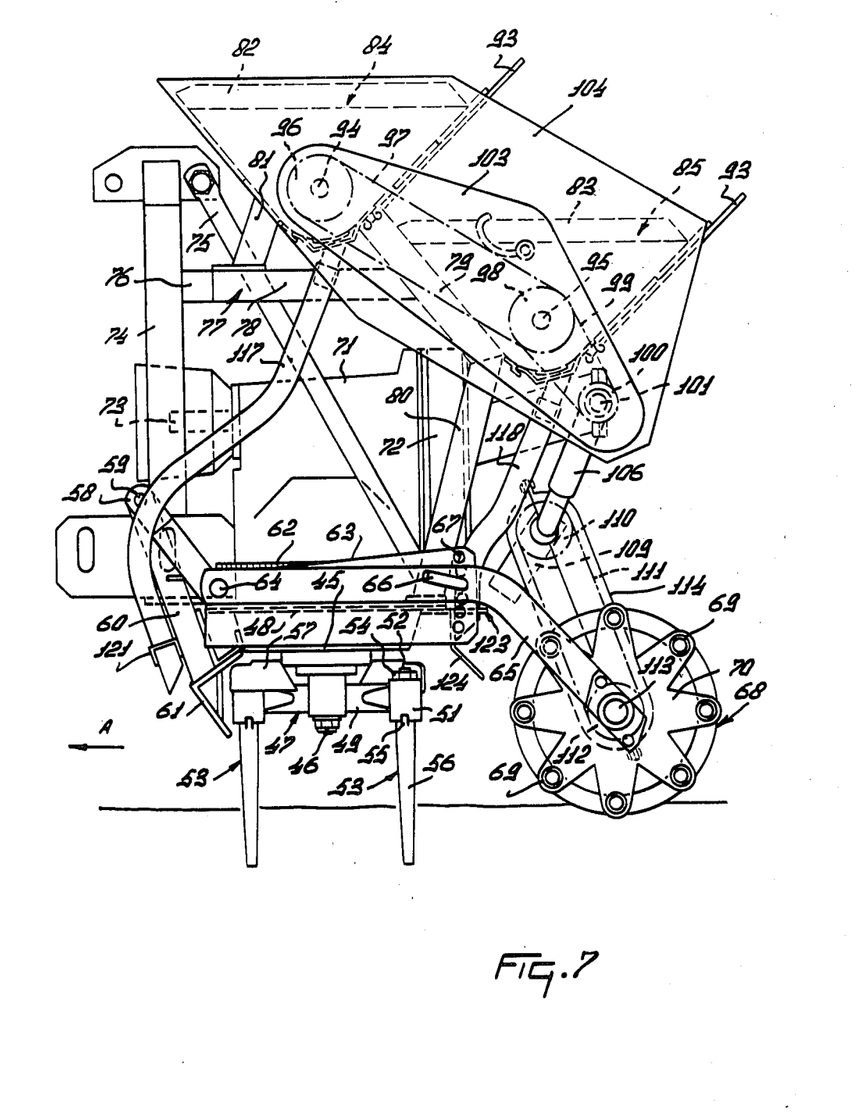
FIG. 7 is a side elevation, to an enlarged scale, of the rotary harrow of FIG. 6.

The rotary harrow or cultivator that is illustrated in FIGS. 6 to 9 of the drawings has a frame portion 45 of generally hollow box-shaped configuration that extends substantially horizontally perpendicular to the intended direction of operative travel of the harrow that is indicated by an arrow A in FIGS. 6 and 7. The frame portion 45 supports an underlying row of soil working members or rotors 47 each of which is rotatable about the axis of a corresponding substantially vertical shaft 46, said shafts 46 being regularly spaced apart from one another by distances which are preferably substantially 25 centimeters. As in the embodiment which has already been described, the shafts 46 are rotatably journalled in both upper and lower members of the frame portion 45 by substantially vertical bearings. The upper bearings are, in fact, secured to a substantially horizontal plate 48 which is welded to an underlying member of the frame portion 45. The shafts 46, of which there are preferably twelve, are provided inside the hollow frame portion 45 with corresponding spur-toothed pinions whose teeth are in driven or driving and driven mesh with the teeth of their neighbour or neighbours. The pinions are not shown in the drawings in detail but appear in broken lines in FIG. 6 thereof.

The lowermost ends of the shafts 46 that project from the bottom of the frame portion 45 are each provided with a corresponding substantially horizontal support 49, said support 49 projecting diametrically oppositely away from the shafts 46 to which they are secured and being provided at their opposite free ends with tine holders in the form of sleeves 51. The sleeves 51 are substantially vertically disposed and receive the fastening portions 52 of tines that are generally indicated by the reference 53. Each fastening portion 52 is provided at its upper end with a screwthread which receives a nut 54 serving to retain the fastening portion 52 in the sleeve 51 and preferably also serving to center said portion in said sleeve by the co-operation of a conical surface of the nut with a conical mouth at the upper end of the sleeve 51. The lower end of each fastening portion 52 carries at least one projecting lug 55 that co-operates with a groove or recess at the lower end of the corresponding sleeve 51 so as to prevent said fastening portion 52 from turning about its own longitudinal axis in the sleeve 51 once the corresponding nut 54 has been tightened. If two diametrically opposite lugs 55 and co-operating grooves are provided, then the tine 53 can occupy two different positions that are turned through 180° relative to one another about the longitudinal axis of the corresponding sleeve 51. Each tine 53 also includes a lower soil-working portion 56 that is integral with the fastening portion 52 but whose longitudinal axis is inclined at an angle of substantially 5° to that of the fastening portion 52. The tines 53 will normally be disposed in their holding sleeves 51 in such a way that the soil working portions 56 thereof are inclined rearwardly with respect to the intended direction of rotation of the corresponding soil working member or rotor 47 so that the tines will "trail" relative to that direction. A screening cap 57 is arranged in front of the nut-receiving upper end of each tine fastening portion 52 with respect to the intended direction of rotation of the corresponding soil worker member or rotor 47, said screening caps 57 protecting the screwthreads of the fastening portions 52, the nuts 54 and the upper ends of the sleeve 51 from flying stones and the like which could otherwise cause individual or cumilative damage.

The frame portion 45 is provided, at equal distances from the opposite sides of its center, with supports 58 that extend upwardly and forwardly with respect to the direction A. The upper end of each support 58 has the top of a corresponding arm 60 connected to it by a pivot pin 59 that extends substantially horizontally perpendicular to the direction A, the arms 60 being inclined downwardly away from the pins 59 and rearwardly with respect to the direction A. The lower ends of the arms 60 are rigidly secured to a screening beam 61 that is of generally L-shaped configuration when seen in cross-section or end view, said beam 61 having its upper extremity located at a horizontal level above that of the screening caps 57 and its lowermost extremity at a level below that of the supports 49, tine-holding sleeves 51 and lugs 50 (see FIG. 7). It will be apparent that, during operation, the screening beam 61 provides additional protection to the fastening portions 52 of the tines 53, and the members by which those fastening portions are carried, against flying stones and other potentially damaging objects. Each arm 60 is engaged near its midpoint by one end of a corresponding helical tension spring 62, said springs 62 extending substantially parallel to the direction A and having their rearmost ends anchored to the top of the frame portion 45. If a stone or the like should penetrate between the screening beam 61 and one or more of the supports 49 and/or holders 51, then the screening beam 61 can deflect forwardly about the pivot pins 59 against the action of the springs 62 until the stone or other obstacle has been cleared.

Vertical plates 63 are mounted alongside the opposite lateral ends of the frame portion 45, said plates 63 having a somewhat greater vertical extent at their rear ends with respect to the direction A than at their front ends. The front ends of said plates 63 carry horizontal stub shafts 64 and arms 65 extend rearwardly from those stub shafts and are turnable thereabout alongside the plates 63. Each arm 65 is formed with a single hole through which a corresponding horizontal locking pin 66 can be entered and the closely neighbouring plates 63 are provided with arcuately curved rows of holes 67 that are all equally spaced from the corresponding stub shaft 64 and in any one of which the corresponding locking pin 66 can be engaged. The rearmost ends of the arms 65 are inclined downwardly to some extent relative to the portions thereof that lie alongside the plate 63 and said ends rotatably support a soil compression member in the form of a roller 68. The roller 68 includes a plurality, such as eight, of elongated tubular or other elements 69 that are disposed helically around the substantially horizontal axis of rotation of the roller and that are supported in holes in the peripheries of a plurality of regularly spaced apart substantially vertical support plates 70.

One of the center pair of the rotary shafts 46 of the soil working members or rotors 47 is extended upwardly to project into a gear box 71. Said extension is provided, inside the gear box 71, with a bevel pinion that is in driven mesh with a further bevel pinion mounted on a shaft (not visible) that extends substantially parallel to the direction A. The rear end of the shaft which has just been mentioned projects into a displaceable change-speed gear assembly 72 that can occupy different positions relative to the gear box 71 in which positions alternative meshing pinions which it contains will be engaged axially with the rear end of the shaft mentioned above and also the rear end of a shaft 73 that again extends substantially horizontally parallel to the direction A. The leading end of the shaft 73 projects forwardly from the gear box 71 and is splined or otherwise keyed to serve as a rotary input shaft intended to be placed in driven connection with the power takeoff shaft of a tractor or other operating vehicle by way of an intermediate telescopic transmission shaft of known construction having universal joints at its opposite ends. This arrangement can be seen in outline in FIG. 6 of the drawings. The change-speed gear assembly 72 incorporates a cover which protects the lubricated pinions which it contains from external contamination and said cover can be removed to enable different meshing pinions to transmit drive from the shaft 73 to the underlying and relatively parallel shaft that is not visible in the drawings, so that depending upon the particular meshing pinions that are chosen, the speed of rotation of the soil working members or rotors 47 will be greater or lesser in response to a single speed of rotation of the input shaft 73.

A generally triangular coupling member or trestle 74 is mounted above and in front of the frame portion 45 and serves for the connection of the rotary harrow or cultivator to the three-point lifting device or hitch of an agricultural tractor or other operating vehicle in the manner which can be seen in outline in FIG. 6 of the drawings. Tie bars 75 have their upper leading ends fastened to the top of the coupling member or trestle 74 and diverge downwardly and rearwardly with respect to the direction A to have their lower rear ends rigidly secured to the top and rear of the frame portion 45.

A horizontal frame beam 76 that extends perpendicular to the direction A is disposed immediately behind the coupling member or trestle 74 and is located at a level a little above one that is midway between the top and bottom of the harrow, said beam 76 being provided towards its opposite ends with frame beams 77 that extend rearwardly from the beam 76 over the frame portion 45, each such beam 77 including a substantially horizontal portion 78, a portion 79 that is downwardly and rearwardly inclined with respect to the direction A and a portion 80 that is downwardly and forwardly inclined with respect to the direction A, the lowermost ends of the portions 80 being secured to the top of the frame portion 45 at the rear of that portion. The horizontal portions 78 carry supports 81 which, together with upward extensions of the inclined portions 79, carry a trough-shaped hopper 82 that is elongated in a horizontal direction perpendicular to the direction A. The inclined portions 79 of the beams 77 also hold a second trough-shaped hopper 83 that is of elongated configuration in the same direction as the hopper 82, said second hopper 83 extending parallel to the hopper 82 but being located at a lower level than the hopper 82 and rearwardly thereof with respect to the direction A. The two hoppers 82 and 83 form parts of corresponding mechanisms 84 and 85 for applying materials such as seeds, fertilisers, pesticides and the like onto the soil and/or into the soil. Each of the two hoppers 82 and 83 has a rounded bottom and each of them contains a corresponding delivery mechanism 86 which is located just above the bottom concerned. Each delivery mechanism 86 comprises a plurality of blade-like members 88 (FIG. 8) that are fastened to a corresponding central support 87 of square cross-section. Agitators 89 are arranged between the blade-shaped members 88 and each member 88 is arranged immediately above a corresponding outlet port 90 in the bottom of the hopper concerned. The ports 90 can be completely closed, or opened to a desired extent, by appropriate adjustment of a masking plate 92 formed with openings 91 and slidable lengthwise of the bottom of the hopper concerned, i.e. in a substantially horizontal direction perpendicular to the direction A. The openings 91 coincide with the outlet ports 90 to an extent that is determined by the setting of a lever 93 pivotally mounted towards one lateral side or end of the corresponding hopper and at the rear thereof with respect to the direction A.

Stub shafts 94 and 95 (FIG. 7) are connected to the corresponding rotatable supports 87 and project from one end of each of the hoppers 82 and 83. These stub shafts 94 and 95 are provided with sprocket wheels 96 and an endless transmission chain 97 is arranged around them. The lower stub shaft 95 carries a second sprocket wheel 98 and a second endless transmission chain 99 extends between the sprocket wheel 98 and a smaller sprocket wheel 100 that is fastened to a shaft 101 which extends substantially horizontally parallel to the axis of rotation of the roller 68. The chains and sprocket wheels which have just been mentioned are surrounded by a protective casing 103 fastened to a vertical plate 104 that interconnects the sides or ends of the two hoppers 82 and 83. The end of the shaft 101 that is remote from the casing 103 and plate 104 is journalled in a horizontal bearing 102 (FIG. 6) supported by the inclined portion 80 of one of the frame beams 77. The end of the shaft 101 is provided, adjacent the bearing 102, with a universal joint 105 that is connected to one end of a telescopic shaft 106. The other end of the shaft 106 is connected by a further universal joint 107 to one end of a short shaft 108 whose opposite end is rotatably supported by a bracket 109 carried by the adjacent roller-supporting arm 65. As can be seen in FIG. 6 and 7 of the drawings, the bracket 109 projects upwardly, and rearwardly with respect to the direction A, from its fastening to the arm 65. The short shaft 108 carries a sprocket wheel 110 which is engaged by an endless transmission chain 111 that also passes around a sprocket wheel 112 carried by a stub shaft 113 at the neighbouring end of the roller 68. A protective casing 114 surrounds the chain 111 and sprocket wheels 110 and 112 and is secured to the inner side of the closely neighbouring arm 65.

A plurality of supporting brackets 115 (FIGS. 8 and 9) carry corresponding pipes 116 that are in register with the outlet ports 90 in the bottoms of the two hoppers 82 and 83. The pipes 116 extend downwardly for short distances and their lower ends are connected to downwardly extending delivery members in the form of flexible hoses 117 (FIG. 7) and 118 (FIGS. 7, 8 and 9). Each of the brackets 115 is readily removable from its appointed position since one end thereof is engaged beneath an offset lug 119 (FIG. 8) whilst the other is fastened to the hopper concerned by a wing nut 120 and a corresponding bolt or stud. The hoses 117 that correspond to the foremost hopper 82 extend downwardly and forwardly with respect to the direction A from the corresponding pipes 116 and their lower ends, which are bent over so as to extend rearwardly with respect to the direction A, are entered through holes in an inverted channel-shaped holder 121 that is fastened to the arms 60 so as to extend substantially horizontally perpendicular to the direction A throughout substantially the whole of the working width of the harrow. The lowermost open delivery ends of the hoses 117 are located at substantially the same horizontal level as the tops of the soil working members or rotors 47 but in front of those rotors and of the screening beam 61 with respect to the direction A. The hoses 118 which correspond to the lower and rearward hopper 83 also extend downwardly and forwardly with respect to the direction A from the pipes 116. The lower ends of the hoses 118 are passed through openings in a holder 123 which is secured to the rear of the frame portion 45 and which comprises a deflector portion 124 which is disposed beneath the lower delivery ends of the hoses 118. The deflector portion 124 is inclined downwardly and rearwardly away from the frame portion 45 with respect to the direction A.

In the use of the rotary harrow or cultivator which has been described with reference to FIGS. 6 to 9 of the drawings, its coupling member or trestle 74 is connected to the three-point lifting device or hitch of a tractor or other operating vehicle in the generally known manner which can be seen in outline in FIG. 6 of the drawings and the rotary input shaft 73 of the gear box 71 is placed in driven connection with the power take-off shaft of the same tractor or other operating vehicle by way of an intermediate telescopic transmission shaft of known construction having universal joints at its opposite ends which shaft can also be seen in FIG. 6 of the drawings. The hoppers 82 and 83 of the mechanisms 84 and 85 are filled with appropriate materials which will frequently be an artificial fertiliser in the leading upper hopper 82 and seeds in the rearward lower hopper 83. The effective depth of penetration of the tines 53 into the ground is adjusted by turning the roller-supporting arms 65 upwardly or downwardly about the stub shafts 64 as may be required, subsequently maintaining the chosen setting by entering the locking pins 66 in appropriate holes 67. As the harrow moves operatively over the ground, each soil working member or rotor 47 will rotate in the opposite direction to the or each of its neighbours, the individual strips of land worked by said rotors 47 overlapping to form, in effect, a single broad strip of worked soil. The roller 68 will be rotated by its contact with the worked soil and its rotation will be transmitted by the shafts, sprocket wheels and chains that have been described to the delivery mechanisms in the two hoppers 82 and 83. Adjustment of the levers 93 controls the effective sizes of the outlet ports 90 and thus governs the amounts of materials per unit area of ground covered that are supplied onto and/or into the soil. Fertiliser and/or pesticide or the like applied to the ground by the hoses 117 in front of the soil working members or rotors 47 is thoroughly mixed with the top soil by the tines 53 so that the seed bed which is formed by those tines is ready to receive the seeds which are supplied over the deflector portion 124 of the holder 123 by the hoses 118. The seeds that fall onto the soil are sufficiently covered and/or pressed into the soil by the roller 68 and will thus germinate satisfactorily. Although not illustrated in the drawings, it is to be noted that the lower ends of the hoses 118 may, if required, be provided with coulters or the like for the positive sowing of seeds in rows. A construction such as has been described with reference to FIGS. 1 to 5 of the drawings could, for example, by employed to this end. The change-speed gear assembly 72 is employed to vary the speeds of rotation of the soil working members or rotors 47 in response to a single speed of rotation of the input shaft 73 to suit the nature and condition of the soil that is to be worked and the depth of penetration of the tines 53 into that soil is also adjusted for similar reasons by moving the axis of rotation of the roller 68 upwardly or downwardly relative to the remainder of the harrow as may be required. This adjustment of the roller 68 relative to the remainder of the harrow can be performed readily and without interfering with the drive to the moving parts in the hoppers 82 and 83 because of the provision of the telescopic shaft 106 having the universal joints 105 and 107 at its opposite ends.

The rotary harrow or cultivator which has been described with reference to FIGS. 6 to 9 of the drawings is of a compact construction and enables land to be fertilised, harrowed or cultivated, sown with seed and subsequently compacted in a single traverse. The application of fertiliser in front of the tines 53 with respect to the direction A ensures that the fertiliser is thoroughly and uniformly mixed with the worked soil so that said fertiliser can stimulate seed germination and subsequent growth without being concentrated in patches which might cause seed scorching. It has been found that the roller 68 alone normally compacts the worked soil to an extent which is sufficient to cover the seeds which fall onto it immediately in front of said roller, effective covering of the seeds normally being required to provide uniform and satisfactory germination.

Figure 10:
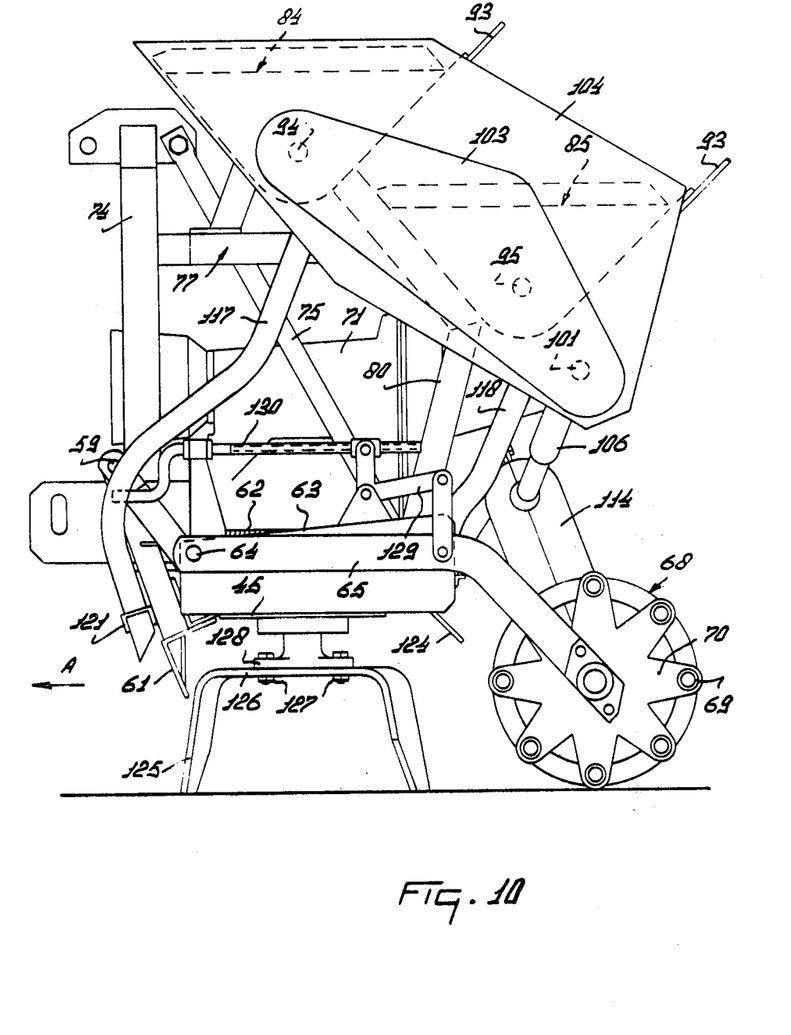

The rotary harrow or cultivator that is illustrated in FIG. 10 of the drawings is similar in most respects to that which has already been described with reference to FIGS. 6 to 9 of the drawings. Accordingly, those parts of the harrow of FIG. 10 which are similar or identical to parts that have already been described are indicated in that figure by the same reference numbers as have been employed in connection with the preceding figures. This is also true of the embodiment of FIG. 11 of the drawings. In the embodiment of FIG. 10, the soil working members or rotors 47 are replaced by soil working members or rotors 125 that comprise pairs of knife-like blades that are integral with substantially horizontal connecting portions 126 which portions are fastened by pairs of bolts 127 to substantially horizontal flange 128 at the lower ends of the corresponding shafts 46. The bolts 127 are preferably formed from a readily breakable material so that they will shear and prevent serious damage to the corresponding soil working member or rotor 125 in the event that a substantially immovable stone or other like obstacle is met with. It will be realised that the blades of the soil working members or rotors 125 are similar in construction and arrangement to the previously described blades 8 and that they are, once again, provided with cutting edges that are leading with respect to the intended directions of rotation, said cutting edges being downwardly and rearwardly inclined from their tops to their bottoms with respect to said intended directions of rotation. Each blade preferably has an upright length of substantially 12 centimeters but the inclined cutting edge thereof does not extend into an uppermost region of the blade.

The arms 65 are, in this embodiment, turned upwardly and downwardly about the stub shafts 64 by cranked spindles 130 having screwthreaded shanks. The spindles 130 are mounted on supports carried by the frame portion 45 so as to be rotatable, but substantially axially immovable, relative to those supports. The screwthreaded shanks of the spindles 130 are inserted through matchingly screwthreaded sleeves pivotally connected to the upwardly directed arms of pivotally mounted levers 129, which levers have rearwardly directed arms which are pivotally connected by links to the arms 65 that are to be adjusted. It will be evident from FIG. 10 of the drawings that manually rotating the cranked handles at the leading ends of the spindles 130 in appropriate directions will turn the arms 65 upwardly or downwardly about the stub shafts 64 as may be required.

Figure 11:
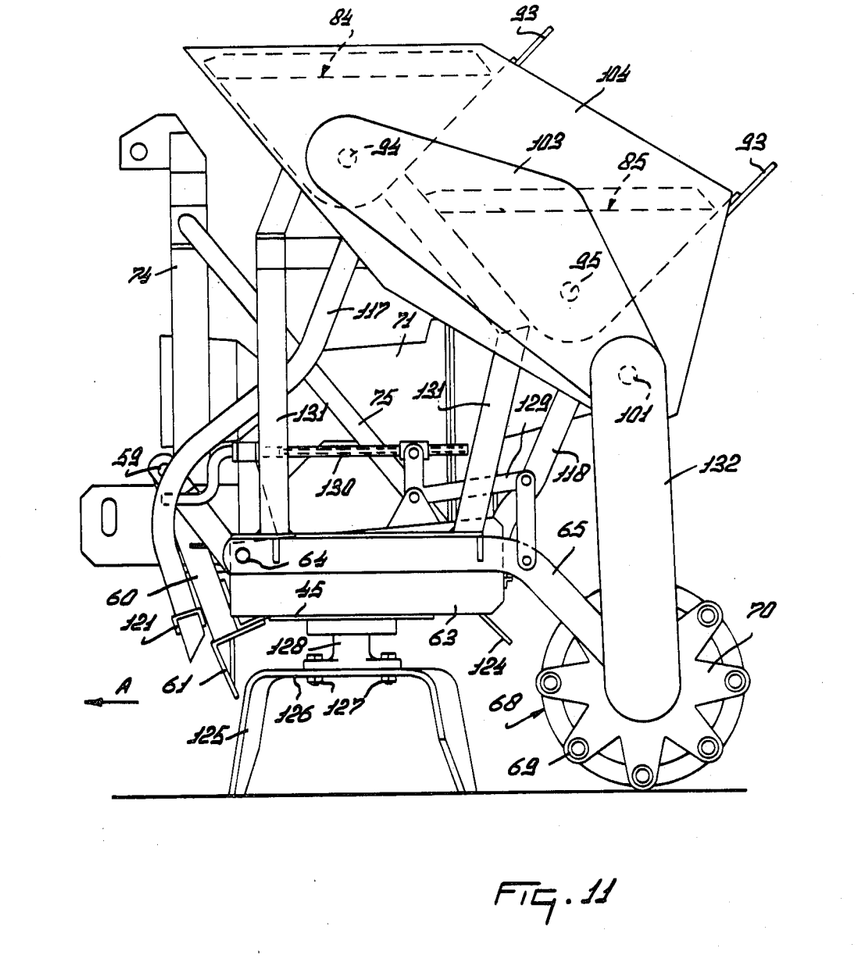

FIG. 11 of the drawings shows a further similar embodiment in which the hoppers 82 and 83 of the two mechanisms 84 and 85 are carried by supports 131 rigidly secured to the two arms 65 at the rear ends of which the roller 68 is rotatably mounted. With this construction, a chain transmission located within a casing 132 can directly drive the transmission members disposed within the casing 103 without the need for the telescopic shaft 106 and the universal joints 105 and 107. This is because the moving parts of the mechanisms 84 and 85 are upwardly and downwardly turnable with the roller 68 about the axis afforded by the stub shafts 64 so that transmission members designed to accommodate changes in position of the axis of rotation of the roller 68 relative to the hoppers 82 and 83 are rendered unnecessary. The spindles 130 that are employed in the embodiment of FIG. 10 for turning the arms 65 upwardly and downwardly about the axis afforded by the stub shafts 64 are again employed for the same purpose in the embodiment of FIG. 11.

Although various features of the rotary harrows or cultivators that have been described and/or illustrated in the accompanying drawings will be set forth in the following claims as inventive features, it is emphasised that the invention is not necessarily limited to those features and that it includes within its scope all of the parts of each rotary harrow or cultivator that has been described and/or illustrated both individually and in various combinations.

What we claim is:

1. A rotary harrow comprising a frame with coupling means at the front of said frame for attaching the harrow to a prime mover, a plurality of soil working members rotatably mounted in a row on upwardly extending shafts supported on a portion of said frame and said row extending transverse to the direction of travel, driving means connected to at least some of said shafts to rotate said soil working members and the lower end of each of said driven shafts having a substantially horizontal portion which extends substantially perpendicular to the axis of rotation of the corresponding soil working member, said horizontal portion supporting at least one straight, blade-like soil working element, the diameter of the path described by the lower end of said blade-like element exceeding the distance between the driven shafts of two neighboring soil working members so that overlapping paths are worked by those members, the leading edge of said bladelike elements, with respect to the normal direction of rotation of its corresponding soil working member, having a straight cutting edge part that extends rearwardly and downwardly for at least two-thirds of the length of said blade-like element to said lower end, the rear edge of said blade-like element extending substantially straight and downwardly towards said lower end and substantially parallel to the shaft of the corresponding soil working member when that element is viewed from the side, said cutting edge part being located closer to the axis of rotation of the corresponding soil working member than is said rear edge.

2. A harrow as claimed in claim 1, wherein there are two flat, soil working blade-like elements on an arm-like support of said driven soil working members, said two elements and arm-like support being formed from a single piece of sheet-material, said elements being angled in positions inclined to the vertical and being twisted about their longitudinal axes.

3. A harrow as claimed in claim 1, wherein said horizontal portion is connected to said element by shearing means located between the end of said portion and the axis of rotation of the corresponding soil working member.

4. A harrow as claimed in claim 3, wherein said shearing means extends substantially parallel to the axis of rotation of the soil working member.

5. A harrow as claimed in claim 3, wherein said shearing means comprises at least one securing bolt on each side of the axis of rotation of said soil working member.

6. A harrow as claimed in claim 3, wherein said soil working member has a plurality of straight soil working bladelike elements which are arranged in at least one pair of oppositely positioned elements around the axis of rotation of the respective soil working member.

7. A rotary harrow comprising a frame with coupling means at the front of said frame for attaching the harrow to a prime mover, a plurality of soil working members rotatably mounted in a row on upwardly extending shafts supported on a portion of said frame and said row extending transverse to the direction of travel, driving means connected to at least some of said shafts to rotate said soil working members and the lower end of each driven shaft having a substantially horizontal portion which extends substantially perpendicular to the axis of rotation of the corresponding soil working member, said horizontal portion supporting at least one straight blade-like soil working element that extends in an inclined outward position with respect to its corresponding axis of rotation, the diameter of the path described by the lower end of said blade-like element exceeding the distance between the driven shafts of two neighboring soil working members so that overlapping paths are worked by those members, the leading edge of said blade-like element, with respect to the normal direction of rotation of its corresponding soil working member, having a straight cutting edge part that extends rearwardly and downwardly for at least two-thirds of the length of said blade-like element to said lower end, the rear edge of said blade-like element extending substantially straight and downwardly towards said lower end and substantially parallel to the shaft of the corresponding soil working member when that element is viewed from the side, said cutting edge part being located closer to the axis of rotation of the corresponding soil working member than is said rear edge.

* * * * *